United States Patent
Koda et al.

(10) Patent No.: US 11,237,571 B2
(45) Date of Patent: Feb. 1, 2022

(54) MAP INFORMATION STORAGE DEVICE, AUTONOMOUS DRIVING CONTROL DEVICE, CONTROL METHOD, PROGRAM AND STORAGE MEDIUM

(71) Applicants: PIONEER CORPORATION, Tokyo (JP); INCREMENT P CORPORATION, Tokyo (JP)

(72) Inventors: Takeshi Koda, Saitama (JP); Kenji Mito, Saitama (JP); Kazuhiro Nakao, Kanagawa (JP); Makoto Hatano, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 61 days.

(21) Appl. No.: 15/560,657

(22) PCT Filed: Mar. 22, 2016

(86) PCT No.: PCT/JP2016/059038
§ 371 (c)(1),
(2) Date: Sep. 22, 2017

(87) PCT Pub. No.: WO2016/152874
PCT Pub. Date: Sep. 29, 2016

(65) Prior Publication Data
US 2018/0113474 A1 Apr. 26, 2018

(30) Foreign Application Priority Data
Mar. 24, 2015 (WO) .................. PCT/JP2015/058883

(51) Int. Cl.
*G05D 1/02* (2020.01)
*G01C 21/36* (2006.01)
(Continued)

(52) U.S. Cl.
CPC .......... *G05D 1/0285* (2013.01); *G01C 21/32* (2013.01); *G01C 21/3658* (2013.01);
(Continued)

(58) Field of Classification Search
CPC .. G05D 1/0285; G05D 1/0274; G05D 1/0088; G01C 21/3658; G01C 21/32; G08G 1/0969; G08G 1/09
See application file for complete search history.

(56) References Cited

U.S. PATENT DOCUMENTS 9,606,539 B1 * 3/2017 Kentley ................ G01S 17/023
10,126,136 B2 * 11/2018 Iagnemma ........... G05D 1/0088
(Continued)

FOREIGN PATENT DOCUMENTS

| CN | 102067052 A | 5/2011 |
|---|---|---|
| JP | 2003141676 A | 5/2003 |

(Continued)

OTHER PUBLICATIONS

Extended European Search Report for Application No. 16768777.1, dated Dec. 11, 2018.
(Continued)

*Primary Examiner* — Rami Khatib
(74) *Attorney, Agent, or Firm* — Nixon & Vanderhye (57) ABSTRACT

A server device 2 stores a distribution map DB 21 including autonomous driving regulatory information Ir for regulating autonomous driving of a vehicle in a predetermined section, and sends map data D1 including the autonomous driving regulatory information Ir to a driving assistance device 1. Then, the driving assistance device 1 receives the map data D1 including the autonomous driving regulatory information Ir and controls the autonomous driving of the vehicle based on the received autonomous driving regulatory information Ir.

4 Claims, 8 Drawing Sheets

(51) Int. Cl.
G01C 21/32 (2006.01)
G08G 1/09 (2006.01)
G05D 1/00 (2006.01)
G08G 1/0969 (2006.01)

(52) U.S. Cl.
CPC ......... G05D 1/0088 (2013.01); G05D 1/0274 (2013.01); G08G 1/09 (2013.01); G08G 1/0969 (2013.01)

(56) References Cited

U.S. PATENT DOCUMENTS

| | | | | |
|---|---|---|---|---|
| 2010/0106356 A1* | 4/2010 | Trepagnier | ............ | G01S 17/023 701/25 |
| 2011/0118939 A1* | 5/2011 | Kawamata | ............ | B60W 10/06 701/41 |
| 2014/0156182 A1* | 6/2014 | Nemec | ................... | G05D 1/021 701/430 |
| 2015/0057871 A1* | 2/2015 | Ono | ....................... | G01C 21/34 701/23 |
| 2015/0066282 A1* | 3/2015 | Yopp | .................... | G05D 1/0061 701/24 |
| 2015/0192428 A1 | 7/2015 | Nemec et al. | | |
| 2017/0122766 A1 | 5/2017 | Nemec et al. | | |
| 2017/0219364 A1* | 8/2017 | Lathrop | ............. | G01C 21/3453 |

FOREIGN PATENT DOCUMENTS

| | | |
|---|---|---|
| JP | 2010-000951 A | 1/2010 |
| JP | 2011-76559 A | 4/2011 |
| JP | 2014106854 A | 6/2014 |
| JP | 2015017944 A | 1/2015 |
| WO | 2014-139821 | 9/2014 |

OTHER PUBLICATIONS

International Search Report dated Jun. 14, 2016 in corresponding International Application No. PCT/JP2016/059038.
Office Action issued in Chinese Patent Application No. 201680017651 dated Oct. 28, 2019 with English translation provided.

* cited by examiner

| PRESENT POSITION INFORMATION | ROAD SECTION INFORMATION | LANE INFORMATION | ... |

| AUTONOMOUS DRIVING LEVEL | COMPATIBILITY WITH THE MODEL | REQUIRED SENSOR |
|---|---|---|
| 1ST LEVEL | O | CAMERA |
| 2ND LEVEL | O | CAMERA+LIDAR |
| 3RD LEVEL | O | CAMERA+LIDAR |
| 4TH LEVEL | × | CAMERA+LIDAR |

| ROAD SECTION | LANE | CONTENTS OF REGULATION |
|---|---|---|
| ROAD SECTION A | LANE A1 | FINE: NO REGULATION |
| | | RAIN: FEASIBLE AT AUTONOMOUS DRIVING LEVEL EQUAL TO OR SMALLER THAN 3RD LEVEL |
| | | SNOW: FEASIBLE AT AUTONOMOUS DRIVING LEVEL EQUAL TO OR SMALLER THAN 2ND LEVEL |
| | LANE A2 | FINE: ID=13564, ... ARE ONLY ALLOWED TO PERFORM AUTONOMOUS DRIVING |
| | | RAIN: ID=13564, ... ARE ONLY ALLOWED TO PERFORM AUTONOMOUS DRIVING ; FEASIBLE AT AUTONOMOUS DRIVING LEVEL EQUAL TO OR SMALLER THAN 3RD LEVEL |
| | | SNOW: ID=13564, ... ARE ONLY ALLOWED TO PERFORM AUTONOMOUS DRIVING ; FEASIBLE AT AUTONOMOUS DRIVING LEVEL EQUAL TO OR SMALLER THAN 2ND LEVEL |
| ROAD SECTION B | LANE B1 | FINE: FEASIBLE AT AUTONOMOUS DRIVING LEVEL EQUAL TO OR SMALLER THAN 2ND LEVEL |
| | | RAIN: FEASIBLE ONLY AT 1ST LEVEL OF AUTONOMOUS DRIVING LEVELS |
| | | SNOW: UNFEASIBLE AT ANY LEVEL |
| | LANE B2 | FINE: UNFEASIBLE AT ANY LEVEL |
| | | RAIN: UNFEASIBLE AT ANY LEVEL |
| | | SNOW: UNFEASIBLE AT ANY LEVEL |
| | LANE B3 | FINE: EXCLUSIVE LANE FOR AUTONOMOUS DRIVING VEHICLES WITHOUT REGULATION |
| | | RAIN: EXCLUSIVE LANE FOR AUTONOMOUS DRIVING VEHICLES WITHOUT REGULATION |
| | | SNOW: EXCLUSIVE LANE FOR AUTONOMOUS DRIVING VEHICLES WITHOUT REGULATION |

AUTONOMOUS DRIVING NOT POSSIBLE

COMPATIBLE WITH 1$^{ST}$ AUTONOMOUS DRIVING LEVEL

COMPATIBLE WITH 2$^{ND}$ & UNDER 2$^{ND}$ AUTONOMOUS DRIVING LEVEL

COMPATIBLE WITH 3$^{RD}$ & UNDER 3$^{RD}$ AUTONOMOUS DRIVING LEVEL

| AUTONOMOUS DRIVING LEVEL | AUTOMATION LEVEL | COMPATIBILITY WITH THE MODEL | REQUIRED SENSOR |
|---|---|---|---|
| FUNCTION A | 1ST LEVEL | ○ | CAMERA |
| | 2ND LEVEL | ○ | CAMERA+LIDAR |
| | 3RD LEVEL | ○ | CAMERA+LIDAR |
| FUNCTION B | 1ST LEVEL | × | — |
| | 2ND LEVEL | ○ | CAMERA+LIDAR |
| ... | ... | ... | ... |

| ROAD SECTION | LANE | CONTENTS OF REGULATION | ... |
|---|---|---|---|
| ROAD SECTION A | LANE A1 | NO REGULATION | ... |
| | LANE A2 | ID=13564, ... ARE ONLY ALLOWED TO PERFORM AUTONOMOUS DRIVING | ... |
| ROAD SECTION B | LANE B1 | 2ND & 1ST LEVELS OF FUNCTION A AND 1ST LEVEL OF FUNCTION B ARE ALLOWED | ... |
| | LANE B2 | UNFEASIBLE AT ANY LEVEL | ... |
| ... | ... | ... | ... |

FIG. 9

| POI OR FEATURE | CONTENTS OF REGULATION | ... |
|---|---|---|
| PARKING AREA A | FEASIBLE AT MAXIMUM AUTONOMOUS DRIVING LEVEL. $3^{RD}$ | ... |
| PARKING AREA B | FEASIBLE AT MAXIMUM AUTONOMOUS DRIVING LEVEL. $4^{TH}$ | ... |
| ... | ... | ... |

MAP INFORMATION STORAGE DEVICE, AUTONOMOUS DRIVING CONTROL DEVICE, CONTROL METHOD, PROGRAM AND STORAGE MEDIUM

TECHNICAL FIELD

The present invention relates to a technology for autonomous driving.

BACKGROUND TECHNIQUE

Conventionally, there is known so-called autonomous driving which automatically controls the driving of a vehicle. At the time of performing autonomous driving, for example, it is necessary to recognize peripheral information on the own vehicle such as a compartment line and a vehicle in front by using external sensors such as a camera and recognize the state (including posture) of the vehicle by using internal sensors such as an acceleration sensor and a gyroscope sensor. Patent Reference-1 discloses a technique for recognizing the traveling lane and a static landmark based on images from a camera mounted on a vehicle. Patent Reference-2 also discloses a technology relating to autonomous driving.

Patent Reference-1: Japanese Patent Application Laid-open under No. 2014-093018

Patent Reference-2: Japanese Patent Application Laid-open under No. 2014-106854

DISCLOSURE OF INVENTION

Problem to be Solved by the Invention

There is such a case that autonomous driving performed by a vehicle which has an autonomous driving function is prohibited depending on regions. For example, it could occur that autonomous driving were prohibited depending on regions even in the same country, e.g., by state laws in the United States, and that autonomous driving were prohibited depending on laws in each country in a land such as Europe. In these cases, unfortunately, the driver of a vehicle equipped with an autonomous driving function has to perform a switching operation of the on-state/off-state of the autonomous driving function whenever the vehicle crosses the border of countries or states.

Even in such an area that autonomous driving is not prohibited by laws, there is a case that restricting autonomous driving is preferred depending on road sections. For example, it might be sensible not to permit autonomous driving in a well-trafficked road section where traveling of autonomous driving is difficult or dangerous such as a small alley in a commercial avenue or in a road section where a terrorist act could be committed by use of a driverless autonomous driving vehicle such as an area including an important governmental facility.

In such a case that a regulation on autonomous driving is presented by signage, a vehicle needs to recognize the regulation on the autonomous driving, for example, by reading the signage by a sensor such as a camera. However, unfortunately, since the recognition accuracy by the sensor is limited depending on the influences of the weather condition and the environment, the certainty cannot be guaranteed. Depending on the tendency or environment of the target area or section, there is a case where restricting the level of autonomous driving or a part of functions regarding autonomous driving contributes to the safety. However, such a detail regulation of autonomous driving is not considered in the above-mentioned patent references.

The above is an example of the problem to be solved by the present invention. An object of the present invention is to provide a map information storage device capable of letting an autonomous driving vehicle suitably recognize regulations on autonomous driving and an autonomous driving control device capable of control the autonomous driving by recognizing the regulations.

Means for Solving the Problem

One invention is a map information storage device including: a storage unit configured to store autonomous driving regulatory information with respect to each predetermined section, the autonomous driving regulatory information indicating a level at which vehicles can perform autonomous driving; and a transmission unit configured to send the autonomous driving regulatory information to a vehicle or a distribution device which communicates with the vehicle.

Another invention is an autonomous driving control device including: an acquisition unit configured to acquire autonomous driving regulatory information with respect to each predetermined section, the autonomous driving regulatory information indicating a level at which vehicles can perform autonomous driving; and a control unit configured to control autonomous driving of a vehicle based on the autonomous driving regulatory information.

Still another invention is a map information storage device including: a storage unit configured to store autonomous driving regulatory information for restricting autonomous driving of vehicle in a predetermined section and map information used for a display unit to display a map; and a transmission unit configured to send the map information and the autonomous driving regulatory information corresponding to a predetermined section on the map to a vehicle or a distribution device which communicates with the vehicle.

Still another invention is a control method executed by a map information storage device, the map information storage device including a storage unit, the storage unit storing autonomous driving regulatory information with respect to each predetermined section, the autonomous driving regulatory information indicating a level at which vehicles can perform autonomous driving, the control method including a transmission process to send the autonomous driving regulatory information to a vehicle or a distribution device which communicates with the vehicle.

Still another invention is a program executed by a computer of a map information storage device, the map information storage device including a storage unit, the storage unit storing autonomous driving regulatory information with respect to each predetermined section, the autonomous driving regulatory information indicating a level at which vehicles can perform autonomous driving, the program making the computer function as a transmission unit configured to send the autonomous driving regulatory information to a vehicle or a distribution device which communicates with the vehicle.

DETAILED DESCRIPTION OF THE PREFERRED EMBODIMENTS

According to a preferable embodiment of the present invention, a map information storage device includes: a storage unit configured to store autonomous driving regulatory information with respect to each predetermined section, the autonomous driving regulatory information indicating a level at which vehicles can perform autonomous driving; and a transmission unit configured to send the autonomous driving regulatory information to a vehicle or a distribution device which communicates with the vehicle.

The term "autonomous driving" according to the present invention indicates not only "full autonomous driving", which does not need any driving operation of a driver under any circumstances, but also "temporal autonomous driving" which does not need a driving operation of a driver under a certain circumstances or conditions. The term "autonomous driving" also includes "partial autonomous driving" (drive assistance function) which automatically controls a part of driving (e.g., steering of vehicle), at the time of a driving operation being performed by a driver, for the purpose of reducing the burden on the driver and/or keeping the running safety of the vehicle.

The map information storage device includes the storage unit and the transmission unit. The storage unit is configured to store autonomous driving regulatory information with respect to each predetermined section, wherein the autonomous driving regulatory information indicates a level at which vehicles can perform autonomous driving. The transmission unit is configured to send the autonomous driving regulatory information to a vehicle or a distribution device which communicates with the vehicle. According to this mode, the map information storage device can suitably regulate the autonomous driving of the vehicle by informing the vehicle of autonomous driving regulatory information which indicates a level at which vehicles can perform autonomous driving in each predetermined section. It is noted that the term "vehicle" herein includes a terminal device moving together with a vehicle.

In one mode of the map information storage device, the storage unit is configured to store map information used for a display unit to display a map, and the transmission unit is configured to send the map information and the autonomous driving regulatory information corresponding to a predetermined section on the map to the vehicle or the distribution device. According to this mode, the map information storage device can suitably inform the vehicle of the regulation of autonomous driving in each road section on the map displayed on the display unit. Thus, for example, by displaying regulations on autonomous driving on a map, the vehicle can let the driver visually recognize the regulations.

In another mode of the map information storage device, the autonomous driving regulatory information is information indicating the level at which vehicles can perform each function of the autonomous driving. In this way, even in such a case that levels are provided with each function of autonomous driving and that the feasible levels of autonomous driving are restricted with respect to each function, the map information storage device can suitably restrict the autonomous driving of the vehicle.

According to another preferable embodiment of the present invention, there is provided an autonomous driving control device including: an acquisition unit configured to acquire autonomous driving regulatory information with respect to each predetermined section, the autonomous driving regulatory information indicating a level at which vehicles can perform autonomous driving; and a control unit configured to control autonomous driving of a vehicle based on the autonomous driving regulatory information. According to this mode, the autonomous driving control device can control the autonomous driving of the vehicle in accordance with the regulations on the feasible autonomous driving level of the vehicle indicated by the autonomous driving regulatory information.

In one mode of the autonomous driving control device, autonomous driving control device further includes a storage unit configured to store capability information indicating a capability of the vehicle regarding autonomous driving, and the control unit is configured to control the autonomous driving based on the capability information and the autonomous driving regulatory information. According to this mode, the autonomous driving control device can suitably determine the feasibility of autonomous driving.

In another mode of the autonomous driving control device, the autonomous driving control device further includes a display unit configured to display a map, and the display unit is configured to display, on the map, the level with respect to each section included in the map based on the autonomous driving regulatory information. According to this mode, the autonomous driving control device can suitably let the driver visually recognize the regulations on each section on the map.

According to still another preferable embodiment of the present invention, there is provided a map information storage device including: a storage unit configured to store autonomous driving regulatory information for restricting autonomous driving of vehicle in a predetermined section and map information used for a display unit to display a map; and a transmission unit configured to send the map information and the autonomous driving regulatory information corresponding to a predetermined section on the map to a vehicle or a distribution device which communicates with the vehicle. According to this mode, the map information storage device can suitably inform the vehicle of the regulations on autonomous driving in each road section on the map to be displayed on the display unit.

According to still another preferable embodiment of the present invention, there is provided a control method executed by a map information storage device, the map information storage device including a storage unit, the storage unit storing autonomous driving regulatory information with respect to each predetermined section, the autonomous driving regulatory information indicating a level at which vehicles can perform autonomous driving, the control method including a transmission process to send the autonomous driving regulatory information to a vehicle or a distribution device which communicates with the vehicle. By executing the control method, the map information storage device can suitably let the vehicle recognize the feasible autonomous driving level of the vehicle to thereby regulate the autonomous driving of the vehicle.

According to still another preferable embodiment of the present invention, a program executed by a computer of a map information storage device, the map information storage device including a storage unit, the storage unit storing autonomous driving regulatory information with respect to each predetermined section, the autonomous driving regulatory information indicating a level at_which_vehicles can perform autonomous driving, the program making the computer function as a transmission unit configured to send the autonomous driving regulatory information to a vehicle or a distribution device which communicates with the vehicle. By executing the program, the computer can suitably let the vehicle recognize the feasible autonomous driving level of the vehicle to thereby regulate the autonomous driving of the vehicle. Preferably, the program can be treated in a state that it is stored in a storage medium.

EMBODIMENT

Now, a preferred embodiment of the present invention will be described below with reference to the attached drawings.

[Overview of Autonomous Driving System]

Figure 1:
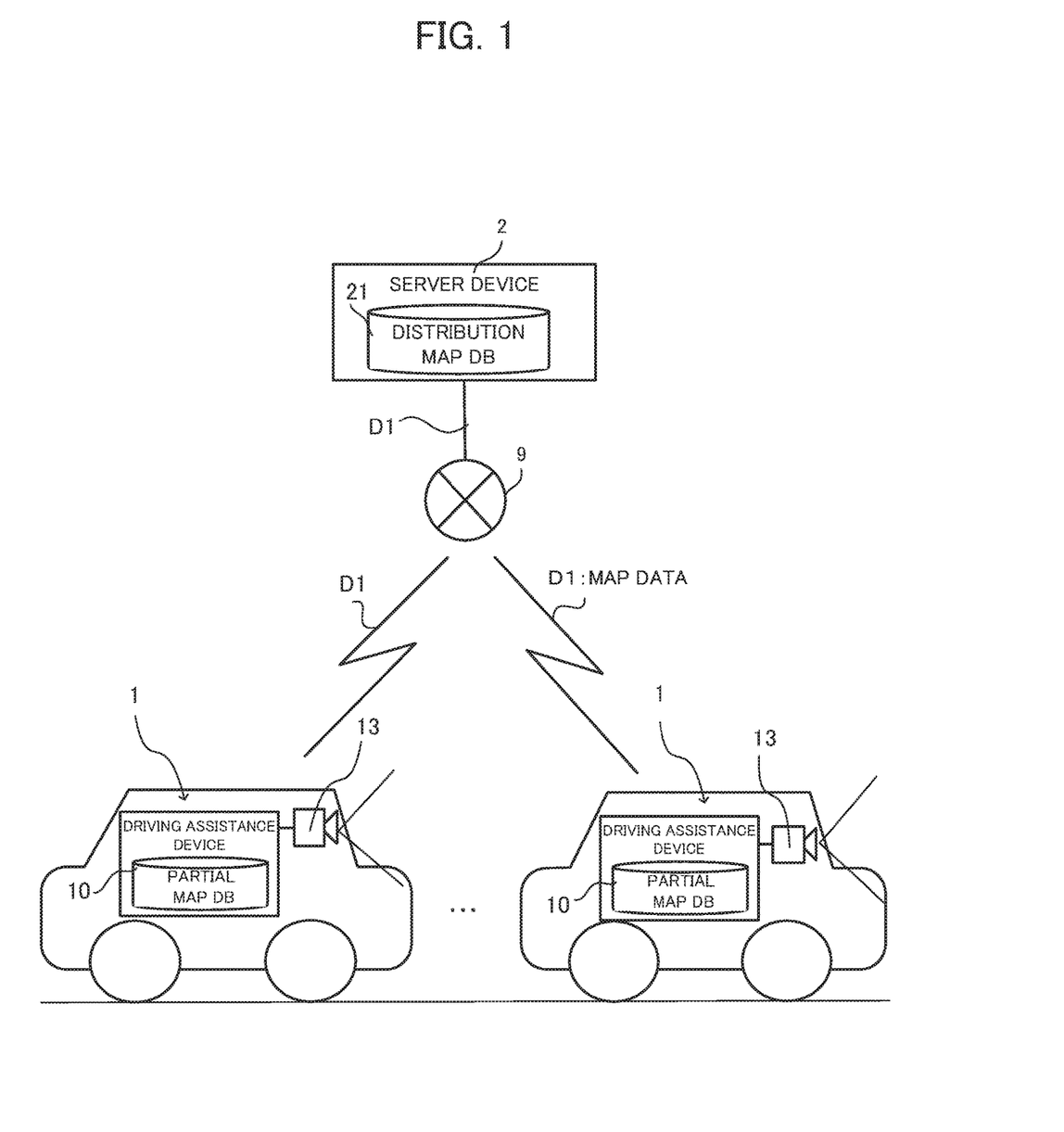
FIG. 1 illustrates a schematic configuration of an autonomous driving system.

FIG. 1 illustrates a schematic configuration of an autonomous driving system according to the embodiment. The autonomous driving system includes driving assistance devices 1 each of which moves together with a vehicle and a server device 2 which communicates with each of the driving assistance devices 1 via a network 9. According to the autonomous driving system, each driving assistance device 1 suitably performs autonomous driving in accordance with traffic regulations provided on each road section.

The driving assistance device 1 is a stationary driving assistance device or a portable phone such as a smart phone, and acquires map data "D1" corresponding to an area including present position of the vehicle from the distribution map DB 21 of the server device 2 to store it as the partial map DB 10. Then, on the basis of the received map data D1, the driving assistance device 1 searches for a route to the destination specified by the user and guides the user based on the specified route.

On the basis of outputs of a sensor unit 13 including a camera, the driving assistance device 1 performs autonomous driving in which whole or a part of driving operations is automated or semi-automated. Regarding the autonomous driving, automation levels (each referred to as "automation level Lv") of driving operations are defined. Accordingly, the driving assistance device 1 recognizes a feasible (executable) automation level Lv based on regulatory information (referred to as "autonomous driving regulatory information Ir") on autonomous driving included in the partial map DB 10 and information (referred to as "autonomous driving capability information Ic") on the capability of the vehicle of the driving assistance device 1 regarding autonomous driving. It is noted that the automation level Lv according to the embodiment has four levels corresponding to the first to the fourth levels as one example. For example, the first level may correspond to the automation of one of an acceleration operation, a steering operation and a braking operation, and the second level may correspond to the automation of multiple operations at the same time selected from the acceleration operation, the steering operation and the braking operation. The third level may correspond to the automation of all of the acceleration operation, the steering operation and the braking operation at all time except for the time of an emergency and the fourth level may correspond to the full automation without needing any driving operation of the driver. The driving assistance device 1 is an example of the "autonomous driving control device" according to the present invention.

The server device 2 stores the distribution map DB 21. In response to a request from the driving assistance device 1, the server device 2 extracts from the distribution map DB 21 the map data D1 corresponding to an area where the requesting driving assistance device 1 exists to thereby send the data to the driving assistance device 1. The autonomous driving regulatory information Ir corresponding to each road section is included in the distribution map DB 21. The server device 2 is an example of the "map information storage device" according to the present invention. The above-mentioned road section indicates a unit section into which a road is arbitrarily separated. For example, each road section may correspond to a link which indicates a road on map data.

[Configuration of Driving Assistance Device]

Figure 2:
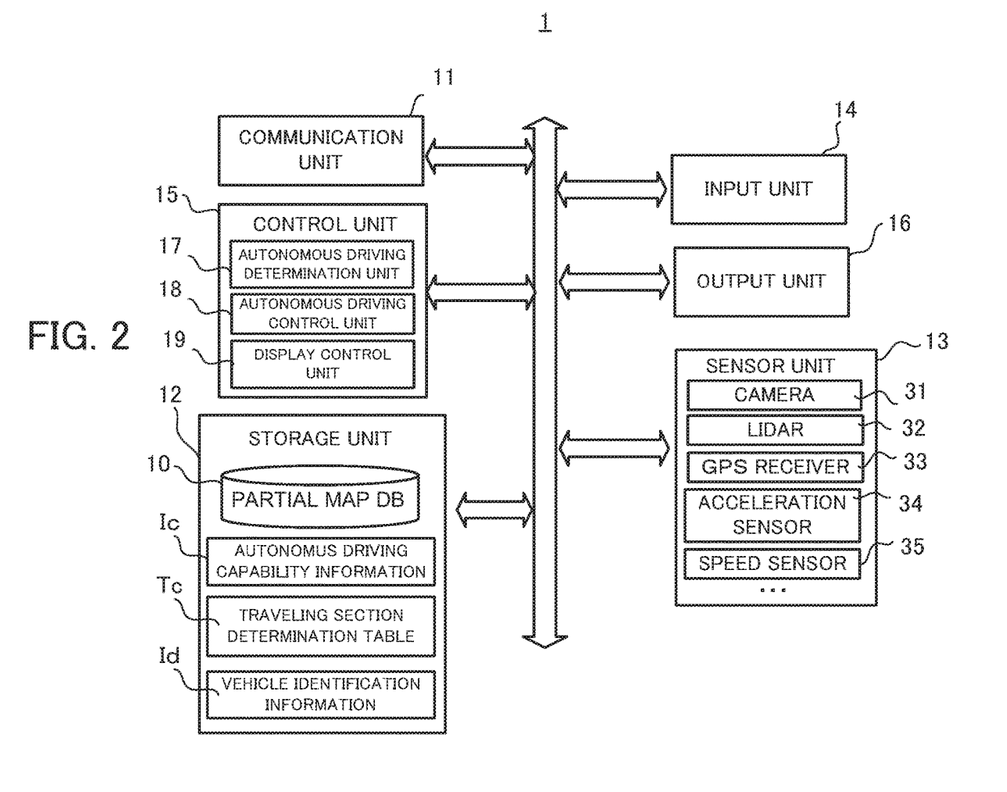
FIG. 2 illustrates a block diagram of a driving assistance device.

FIG. 2 is a block diagram indicating a functional configuration of a driving assistance device 1. As illustrated in FIG. 2, the driving assistance device 1 mainly includes a communication unit 11, a storage unit 12, a sensor unit 13, an input unit 14, a control unit 15 and an output unit 16. The communication unit 11, the storage unit 12, the sensor unit 13, the input unit 14, the control unit 15 and the output unit 16 are connected to each other via a bus line.

Under the control of the control unit 15, the communication unit 11 acquires the map data D1 from the server device 2. Additionally, under the control of the control unit 15, the communication unit 11 acquires weather information from a server device that delivers weather information.

The storage unit 12 stores a program to be executed by the control unit 15 and information necessary for the control unit 15 to execute a predetermined processing. According to the embodiment, the storage unit 12 stores the partial map DB 10 including the autonomous driving regulatory information Ir, the autonomous driving capability information Ic, a traveling section determination table Tc and vehicle identification information Id which indicates an identification number allocated to the vehicle of the driving assistance device 1, wherein the traveling section determination table Tc is a table which indicates the road section and the lane corresponding to the present position information. The identification number indicated by the vehicle identification information Id may be a unique identification number with respect to each individual vehicle or with respect to each model (type) of vehicles. As described later, in such a case that the autonomous driving regulatory information Ir specifies the identification numbers of vehicles which is allowed to perform autonomous driving, the vehicle identification information Id is used for determining whether or not the own vehicle corresponds to one of the vehicles allowed to perform autonomous driving.

The sensor unit 13 is configured of an internal sensors which detect the state of the vehicle and an external sensors for recognizing the peripheral environment of the vehicle. The sensor unit 13 includes a camera 31, a LIDAR (Laser Illuminated Detection and Ranging) (and/or radar) 32, a GPS receiver 33, an acceleration sensor 34 and a speed sensor 35. The camera 31 generates an image with color indicating the external situation. The LIDAR 32 discretely measures distance to an external object and recognizes the position of the object as a three dimensional point group. The GPS receiver 33 generates position information indicating the longitude and the latitude of the present position of the vehicle. The acceleration sensor 34 detects the acceleration of the vehicle. The speed sensor 35 detects the velocity of the vehicle. It is noted that the sensor unit 13 may include a gyroscope sensor and an IMU (Inertial Measurement Unit) for recognizing the posture (e.g., direction) of the vehicle in order to correct data acquired from other sensors. The sensor unit 13 may also includes a sensor which measures a weather condition such as a rain sensor and a fog sensor. In this case, instead of or in addition to acquiring the weather information through the communication unit 11, the control unit 15 generates weather information by determining the present weather condition based on the output of the sensor unit 13.

Examples of the input unit 14 include a button, a remote controller and an audio input device for user operations. The input unit 14 accepts an input specifying a destination used for a route search and an input specifying the on-state/off-state of autonomous driving. The input unit 14 may also accept information on driving ability of a person riding on the vehicle such as information on the presence/absence of a driver license and information on a driving skill. Such information accepted by the input unit 14 may be stored on the storage unit 12 under the control of the control unit 15. It is noted that, instead of acquiring information on the driving ability based on the user input through the input unit 14, the control unit 15 may certify a driver through an individual certification means and thereafter electrically acquire information of the driving ability associated with the certified driver. In this case, for example, the control unit 15 acquires an ID for specifying the driver through a biometric identification or by reading out the personal IC card, and lets the communication unit 11 send a request signal specifying the ID acquired through the biometric identification or the like to a server device which stores individual information such as information on the history of the driving operation and information on acquisition of a driver license. Then, through the communication unit 11, the control unit 15 receives from the server device information on the driving ability of the driver corresponding to the ID specified by the request signal. In this way, the control unit 15 may electrically acquire information on the driving ability.

The output unit 16 is a display and/or a speaker which output under the control of the control unit 15, for example. According to the embodiment, the output unit 15 displays a map of an area of the present position based on the partial map DB 10.

The control unit 15 includes a CPU for executing programs and controls the entire driving assistance device 1. The control unit 15 conducts a route search to the destination inputted through the input unit 14 to thereby determine the route for autonomous driving and/or route guidance. The control unit 15 registers on the partial map DB 10 the map data D1 acquired through the communication unit 11. In this case, for example, at the time of approaching or making a prediction of entering such an area that the corresponding map data has not been registered yet on the partial map DB 10, the control unit 15 sends information indicating the area to the server device 2 through the communication unit 11 to thereby acquire the map data D1 corresponding to the area from the communication unit 11.

Additionally, the control unit 15 according to the embodiment includes an autonomous driving determination unit 17, an autonomous driving control unit 18 and a display control unit 19.

On the basis of the present position information indicating the present position recognized from the output of the sensor unit 13 and the partial map DB 10, the autonomous driving determination unit 17 recognizes the road section (referred to as "traveling section") and the lane (referred to as "traveling lane") where the vehicle is traveling. Then, the autonomous driving determination unit 17 extracts the autonomous driving regulatory information Ir corresponding to the recognized traveling section and the traveling lane from the partial map DB 10 and recognizes the feasible automation level Lv of the autonomous driving with reference to the autonomous driving capability information Ic and the vehicle identification information Id which are stored on the storage unit 12.

On the basis of the determined route, the autonomous driving control unit 18 performs autonomous driving of the vehicle by using output information of the sensor unit 13. In this case, the autonomous driving control unit 18 determines the automation level Lv of the autonomous driving based on the determination result of the autonomous driving determination unit 17.

The display control unit 19 displays on the output unit 16 the map of an area of the present position with reference to the partial map DB 10. Then, on the basis of the autonomous driving regulatory information Ir, the control unit 15 displays a map view which explicitly illustrates the feasible automation level Lv of the autonomous driving per road section or area.

The control unit 15 is an example of the "acquisition unit" and the "control unit" according to the present invention.

[Configuration of Sever Device]

Figure 3:
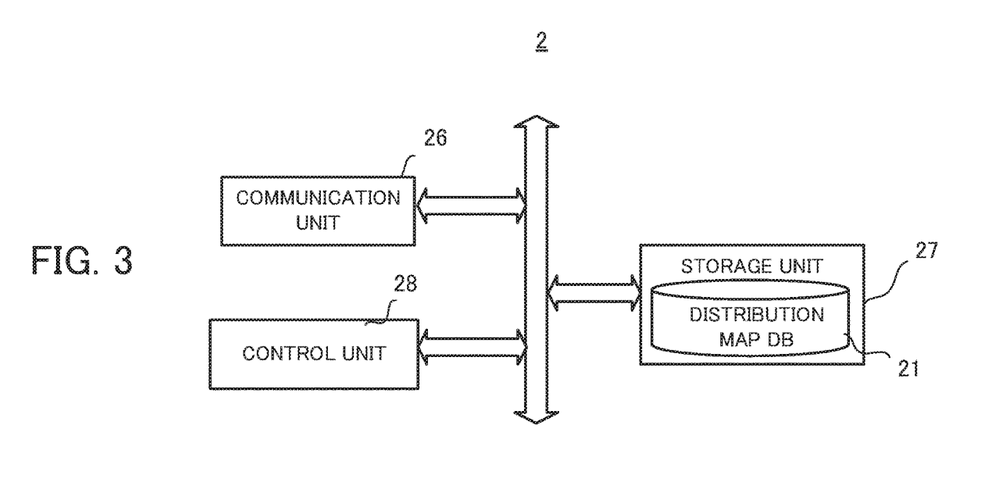
FIG. 3 illustrates a block diagram of a server device.

FIG. 3 illustrates a schematic configuration of the server device 2. As illustrated in FIG. 3, the server device 2 includes a communication unit 26, a storage unit 27 and a control unit 28. The communication unit 26, the storage unit 27 and the control unit 28 are connected to each other via a bus line.

Under the control of the control unit 28, the communication unit 26 communicates with the driving assistance device 1 via the network 9 to exchange various kinds of information. According to the embodiment, at the time of receiving a request for the map data D1 from the driving assistance device 1, the communication unit 26 sends the map data D1 extracted by the control unit 28 to the driving assistance device 1.

The storage unit 27 stores a program for controlling the behaviors of the server device 2 and information necessary for the server device 2 to execute a predetermined processing. The storage unit 27 stores the distribution map DB 21 including the autonomous driving regulatory information Ir each piece of which corresponds to each road section.

The control unit 28 includes a CPU, a ROM and a RAM which are not shown and performs various controls over each component of the server device 2. According to the embodiment, when the communication unit 26 receives a request for the map data D1 from the driving assistance device 1, the control unit 28 extracts from the distribution map DB 21 the map data corresponding to the area specified by the request. Then, the control unit 28 sends the extracted map data as the map data D1 to the driving assistance device 1 through the communication unit 26. The control unit 28 is an example of the "transmission unit" according to the present invention and a computer which executes the program according to the present invention.

[Data Structure]

Figure 4A:
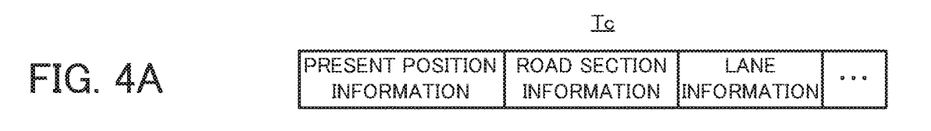
FIGS. 4A to 4C indicate examples of the data structures of a traveling section determination table, a map database, and autonomous driving capability information.

FIG. 4A indicates an example of the data structure of the traveling section determination table Tc. On the traveling section determination table Tc indicated by FIG. 4A, there are associated, at least, present position information, road section information on the road section existing at the position indicated by the present position information, and lane information on the lane existing at the position indicated by the present position information. By referring to the traveling section determination table Tc indicated in FIG. 4A based on the present position information indicating the present position acquired by use of the sensor unit 13 and the partial map DB 10, the autonomous driving determination unit 17 recognizes the traveling section and the traveling lane where the vehicle exists.

Figure 4B:
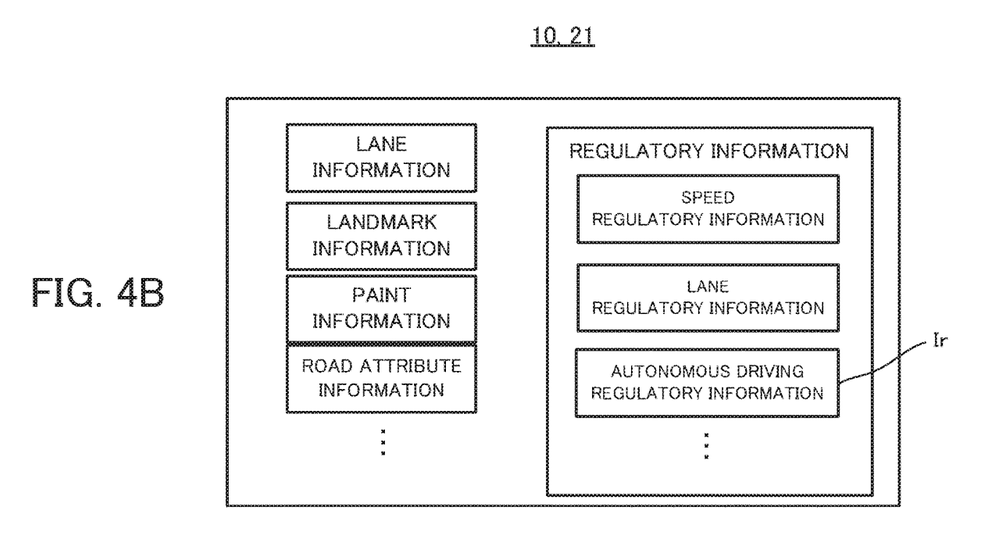

FIG. 4B illustrates a diagram which visualizes information on autonomous driving included in the partial map DB 10 and the distribution map DB 21. As illustrated in FIG. 4B, the partial map DB 10 and the distribution map DB 21 include lane information, landmark information, paint information, road attribute information and regulatory information. The lane information is information relating to lanes and examples of the lane information include information on the number of the lanes, position information on each lane, and attribute information on each lane such as information indicating whether the lane is a merging lane or a diverging lane. The lane information also includes information on exclusive (priority) lanes for autonomous driving vehicles. Examples of the information on the exclusive lanes for autonomous driving vehicles include information indicating the presence or absence of exclusive lanes for autonomous driving vehicles, information indicating the number of the exclusive lanes for autonomous driving vehicles in a case where there are exclusive lanes for autonomous driving vehicles, and the position information on each exclusive lane. The landmark information is information on a landmark to be a target object to be detected by the driving assistance device 1 at the time of autonomous driving. Examples of the landmark information include information on the presence or absence of a utility pole, a guardrail, a road sign and a traffic signal, the position information on the landmark, the height information and the shape information thereon in a case where there is any of these objects. The paint information is information relating to road marking paints such as a white line (compartment line), a yellow line, a crosswalk, and the examples of the paint information include the information on the position, the line width and/or the line type thereof. The road attribute information is information on the road condition of the corresponding road section. Examples of the road attribute information include height difference on the road section, average bank angle, and road surface condition (whether gravel road or paved road). The regulatory information is information for regulating driving and includes speed regulatory information that is information for limiting the traveling speed, lane regulatory information that is information for restricting travelable lanes, and the autonomous driving regulatory information Ir.

Figure 5:
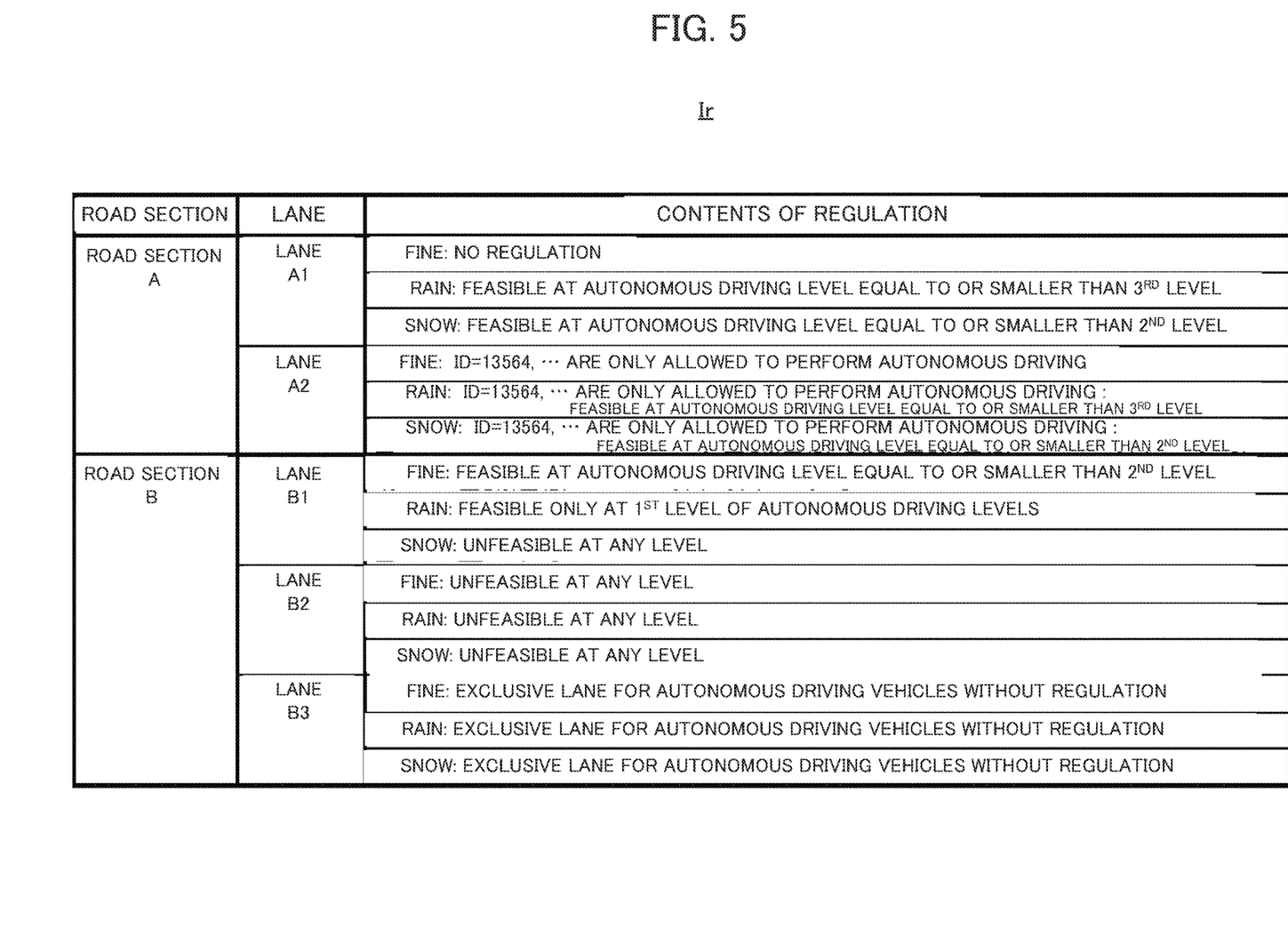
FIG. 5 indicates an example of the data structure of autonomous driving regulatory information.

FIG. 5 is an example of the data structure of the autonomous driving regulatory information Ir. The autonomous driving regulatory information Ir includes each item "ROAD SECTION", "LANE", "CONTENTS OF REGULATION". In the item "CONTENTS OF REGULATION", there are registered contents of a regulation of autonomous driving with respect to each lane of each road section and each type of weather. For example, in the case of the lane A1 in the road section A at the time of the weather "fine", there is no regulation of autonomous driving thereon. In the case of the lane A2 in the road section A at the time of the weather "fine", only vehicles having the identification number "13564" or other specified identification number are allowed to perform autonomous driving thereon and other vehicles are prohibited from autonomous driving. In the case of the lane B1 in the road section B at the time of the weather "fine", autonomous driving at only a level equal to or lower than second level is allowed thereon. In the case of lane B2 of the road section B, autonomous driving at all automation level Lv is prohibited thereon regardless of weather.

Generally, autonomous driving is expected to be more difficult in bad weather than the autonomous driving in fine weather due to the decrease of the detection accuracy of sensors used for autonomous driving. Above things considered, contents of the regulation are registered with respect to each type of weather on the autonomous driving regulatory information Ir illustrated in FIG. 5. It is noted that, instead of the example in FIG. 5, the contents of the regulation may be registered with respect to each lane without being registered with respect to each type of weather. In this case, for example, the contents of the regulation at the time of a predetermined type of weather (e.g., fine weather) are registered with respect to each lane.

According to the example in FIG. 5, in the case of the lane B3 in the road section B, there are registered indications that the lane is an exclusive lane for autonomous driving vehicles and that there is no regulation of autonomous driving on the lane. In this way, in the case of an exclusive lane for autonomous driving vehicles, the information indicating an exclusive lane for autonomous driving vehicles may be registered together with regulatory information on autonomous driving such as information indicating no regulation of autonomous driving and information on prohibition of autonomous driving at a level equal to or lower than a predetermined level.

Figure 4C:
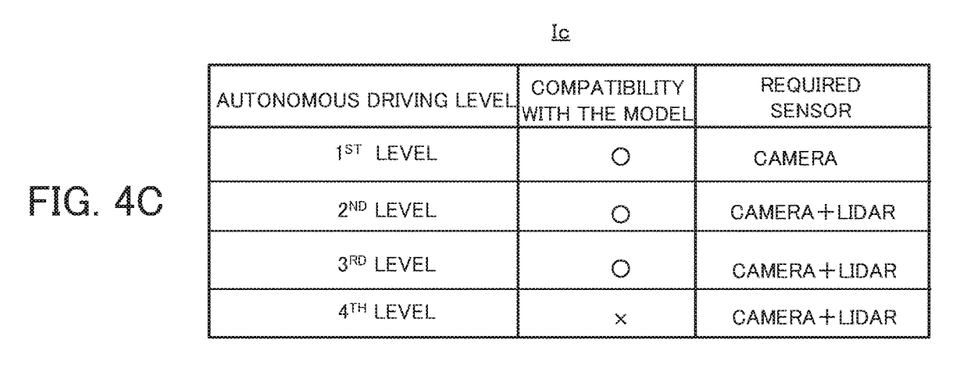

FIG. 4C is an example of the data structure of the autonomous driving capability information Ic. In the autonomous driving capability information Ic, the compatibility with the vehicle and the required sensor (s) are defined with respect to each automation level Lv. According to the autonomous driving capability information Ic illustrated in FIG. 4C, the vehicle of the driving assistance device 1 is compatible with autonomous driving at the first to the third levels of the automation level Lv and not compatible with autonomous driving at the fourth level of the automation level Lv. Since the sensor unit 13 includes the camera 31 and the LIDAR 32, the driving assistance device 1 can perform autonomous driving control at the first to the third levels on a road where there is no regulation of the autonomous driving. In such a case that a sensor specified at the item "REQUIRED SENSOR" putted into a disabled state due to troubles or the sensor is not provided with the vehicle nor the driving assistance device 1, the autonomous driving determination unit 17 determines that it cannot perform autonomous driving at even such an automation level Lv that the item "COMPATIBILITY OR THE MODEL" of the automation level Lv indicates "o".

A description will be given of the determination method of the autonomous driving determination unit 17 with reference to FIG. 4C and FIG. 5.

For example, when the autonomous driving determination unit 17 determines that the vehicle of the driving assistance device 1 is traveling on the lane A1 in the road section A and that the weather is "fine", the autonomous driving determination unit 17 recognizes that there is no regulation of autonomous driving with reference to the autonomous driving regulatory information Ir. Thus, in this case, the autonomous driving determination unit 17 determines that autonomous driving can be performed at the first to the third levels and the autonomous driving control unit 18 performs the autonomous driving at the third level which is the highest level of all the feasible levels. When the autonomous driving determination unit 17 determines that the vehicle of the driving assistance device 1 is traveling on the lane A2 in the road section A and that the weather is "fine", the autonomous driving determination unit 17 determines whether or not the identification number indicated by the vehicle identification information Id stored on the storage unit 12 matches one of the identification numbers specified in the item "CONTENTS OF REGULATION" corresponding to the lane A2 in the road section A. In such a case that the identification number indicated by the vehicle identification information Id stored on the storage unit 12 matches one of the identification numbers specified in the item "CONTENTS OF REGULATION" corresponding to the lane A2 in the road section A, the autonomous driving determination unit 17 determines that autonomous driving can be performed at the first to the third levels. In contrast, the autonomous driving determination unit 17 determines that autonomous driving cannot be performed in the other cases.

When the autonomous driving determination unit 17 determines that the vehicle of the driving assistance device 1 is traveling on the lane B1 in the road section B and that the weather is "fine", the autonomous driving determination unit 17 recognizes that autonomous driving at a level equal to or lower than the second level can be performed with reference to the autonomous driving regulatory information Ir. Thus, in this case, the autonomous driving control unit 18 performs the autonomous driving at the second level which is the highest level of all the feasible levels. When the autonomous driving determination unit 17 determines that the vehicle of the driving assistance device 1 is traveling on the lane B2 in the road section B, the autonomous driving determination unit 17 recognizes that autonomous driving is prohibited on the lane B2 according to the autonomous driving regulatory information Ir. Thus, in this case, the autonomous driving control unit 18 does not perform autonomous driving.

It is noted that the contents of the autonomous driving regulatory information Ir illustrated in FIG. 5 and the autonomous driving capability information Ic illustrated in FIG. 4C may vary depending on predetermined areas. In this case, the storage unit 12 stores the autonomous driving regulatory information Ir and the autonomous driving capability information Ic each of which varies with respect to each predetermined area. This is because the definition of levels of autonomous driving is predicted to vary depending on each area (i.e., per country in Europe or per state in North America). Preferably, the control unit 15 receives the latest autonomous driving regulatory information Ir and the latest autonomous driving capability information Ic from the server device 2 at predetermined time intervals to thereby update the autonomous driving regulatory information Ir and the autonomous driving capability information Ic stored on the storage unit 12 at the predetermined time intervals. This is because the definition of levels of autonomous driving could be changed over time.

At the time of accepting information on a driving ability of a person (or a driver) riding on the vehicle through the input unit 14, the autonomous driving determination unit 17 may determine the degree (level) of autonomous driving to be performed by the autonomous driving control unit 18 in further consideration of the information on the driving ability. For example, in such a case that the driving ability of the person is low, the autonomous driving determination unit 17 may prohibit the autonomous driving control at a level equal to or under the third level and permits the autonomous driving at only the fourth level.

Display Example

Figure 6:
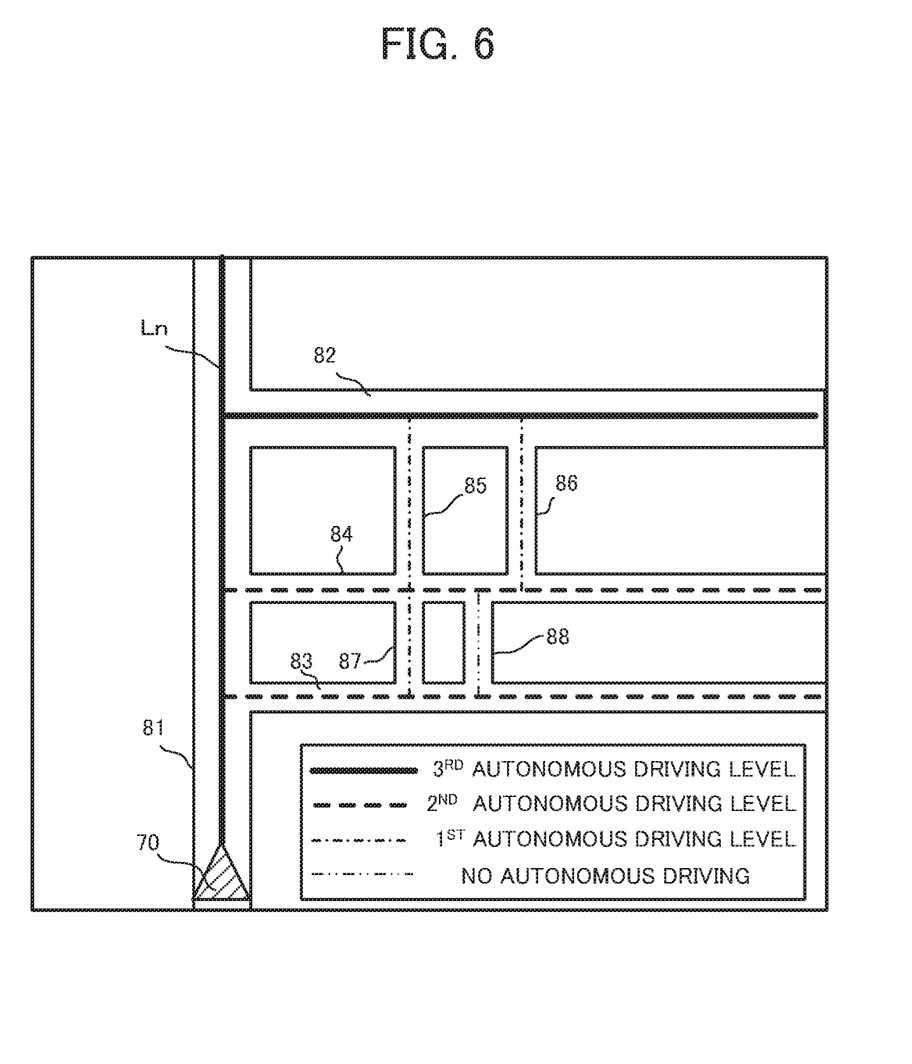
FIG. 6 is an display example of a map based on autonomous driving regulatory information at the time of a relatively large reduction scale being applied.
Figure 7:
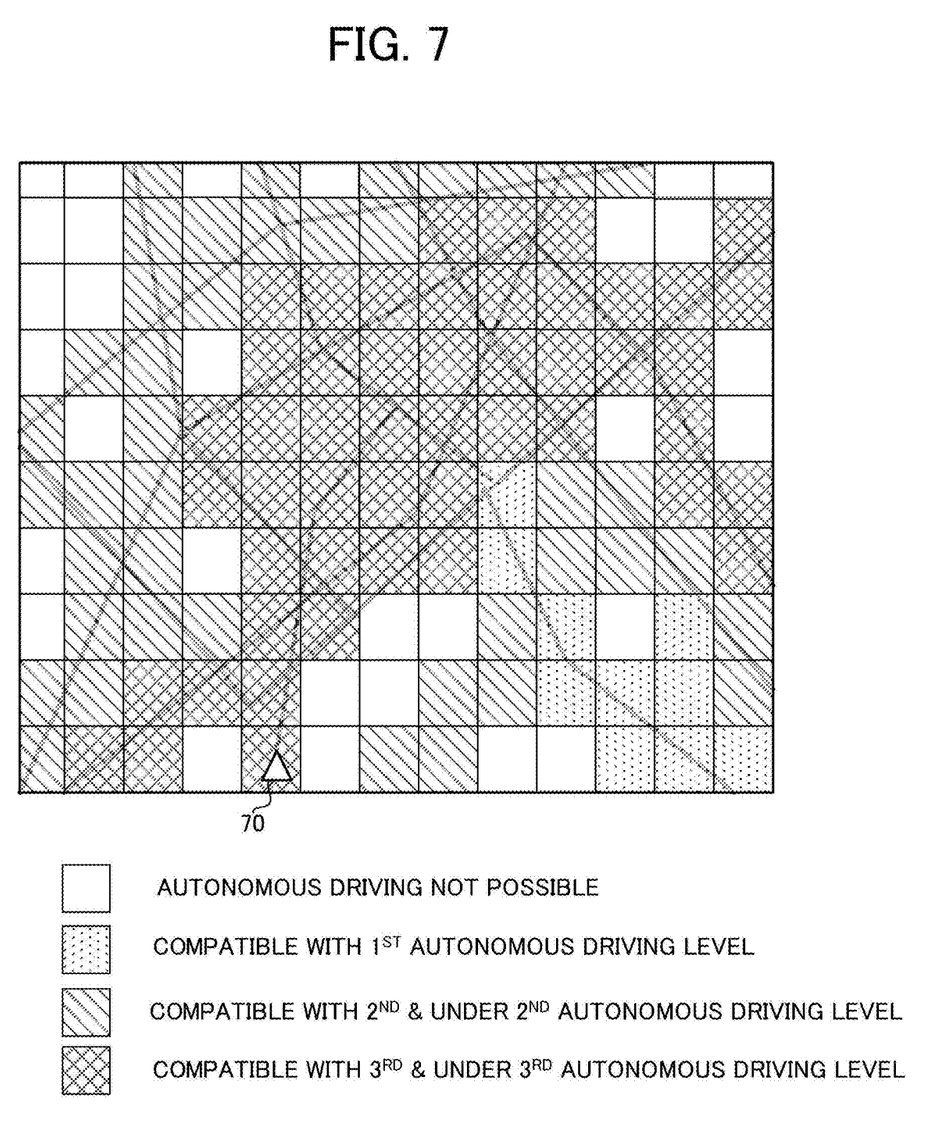
FIG. 7 is an display example of a map based on autonomous driving regulatory information at the time of a relatively small reduction scale being applied.

FIGS. 6 and 7 illustrate display examples of map views which the display control unit 19 displays by referring to the partial map DB 10. According to FIGS. 6 and 7, with reference to the partial map DB 10, the display control unit 19 displays each map of an area of the present position measured by the GPS receiver 33.

FIG. 6 is a display example at the time of a relatively large reduction scale being applied. In this case, there are roads 81 to 88 in the display range of the map. The mark 70 indicates the present position of the vehicle. According to FIG. 6, on the roads 81 to 88, the display control unit 19 displays lines (referred to as "level indication lines Ln") indicating the automation levels Lv which are not restricted by the autonomous driving regulatory information Ir. Here, the display control unit 19 determines each line type of the level indication lines Ln in accordance with the highest automation level Lv out of the feasible automation levels Lv that are free from the restriction of autonomous driving according to the autonomous driving regulatory information Ir. According to FIG. 6, the display control unit 19 superimposes the solid level indication lines Ln on the roads 81 and 82 corresponding to the road sections whose highest automation level Lv is the third level while superimposing the dashed level indication lines Ln on the roads 83 and 84 corresponding to the road sections whose highest automation level Lv is the second level. Additionally, the display control unit 19 superimposes the dot-and-dash level indication lines Ln on the roads 85 to 87 corresponding to the road sections whose highest automation level Lv is the first level while superimposing the two-dot chain level indication line Ln on the road 88 corresponding to the road section where autonomous driving is prohibited. It is noted that the display control unit 19 may change the line width and/or the line color (or the color of the displayed road itself) depending on the highest automation level Lv out of the feasible automation levels Lv that are free from the restriction of the autonomous driving according to the autonomous driving regulatory information Ir.

FIG. 7 is a display example at the time of a relatively small reduction scale being applied. In the example illustrated in FIG. 7, the display control unit 19 firstly divides the map of an area of the present position into a predetermined number of meshes. Next, the display control unit 19 acquires information on contents (i.e., a feasible autonomous driving level on each road section or lane) of regulations of autonomous driving in road sections included in each divided mesh. Then, the display control unit 19 displays each mesh by using a color that depends on the information on the contents of the corresponding regulations. According to this display mode, a user can get a quick overview of the degree of regulations and the distance that the user can advance from a predetermined position (e.g., present position) under each regulation. In other words, the user can easily recognize places and a range reachable from a predetermined position (e.g., present position) by using a specified autonomous driving level.

In such a case that information on contents of multiple regulations with respect to a certain mesh are acquired, as a first example, information on contents of a regulation corresponding to a road section (or lane) which occupies the largest space (area) in the mesh may be adopted. As a second example, the highest autonomous driving level in the mesh may be adopted. According to the first and second examples, the user can recognize that there is at least one road or one lane compatible with the adopted autonomous driving level in the mesh. As a third example, the lowest autonomous driving level in the mesh may be adopted. According to the third example, the user can recognize that the user can travel in the mesh while keeping at least the adopted autonomous driving level. In other words, the user can recognize the absolutely-feasible autonomous driving level in the mesh. As a fourth example, in such a case that a predetermined traveling route has been set, the autonomous driving level corresponding to the roads or lanes included in the traveling route may be adopted. According to the fourth example, the user can easily recognize the transition of the autonomous driving levels at the time of traveling on the predetermined traveling route.

The display control unit 19 may acquire information on the reduction scale of the displayed map to thereby change the display mode depending on the information on the reduction scale. For example, if the reduction scale according to the information is larger than a predetermined reduction scale, the display control unit 19 displays information on the contents (autonomous driving level) of the regulation per road or lane by using the level indication lines Ln as illustrated in FIG. 6. In contrast, if the reduction scale according to the information is smaller than the predetermined reduction scale, the display control unit 19 may display information on the contents of regulations per mesh as illustrated in FIG. 7.

As described above, by displaying a map in such a state that the automation level Lv of autonomous driving free from regulations according to the autonomous driving regulatory information Ir can be visually recognized, the driving assistance device 1 can let the driver recognize sections which need driving operations and the needed degree of the driving operations.

In the display example illustrated in FIG. 6, the display control unit 19 may change the display mode of level indication lines Ln, each of which is superimposed on each road on the map, depending on the automation level Lv to be adopted at the time when the vehicle of the driving assistance device 1 travels on each road. In this case, the display control unit 19 determines the feasible automation level Lv with respect to each road displayed on the map by considering not only the autonomous driving regulatory information Ir but also the vehicle identification information Id and the autonomous driving capability information Ic stored on the storage unit 12, and displays the level indication lines Ln based on the determination results. Regarding the display example illustrated in FIG. 7, the display control unit 19 may also change the display mode of a mesh depending on the automation level Lv to be adopted at the time when the vehicle of the driving assistance device 1 travels on roads in the mesh.

As described above, the 2 according to the embodiment stores the distribution map DB 21 including autonomous driving regulatory information Ir for regulating autonomous driving of a vehicle in a predetermined section, and sends the map data D1 including the autonomous driving regulatory information Ir to the driving assistance device 1. Then, the driving assistance device 1 receives the map data D1 including the autonomous driving regulatory information Ir and controls the autonomous driving of the vehicle based on the received autonomous driving regulatory information Ir. Thereby, the server device 2 can let the driving assistance device 1 of the vehicle recognize the regulations of autonomous driving to thereby suitably regulate autonomous driving of the vehicle.

MODIFICATIONS

Next, a description will be given of preferred modifications of the embodiment. The following modifications may be applied to the above embodiment in any combination.

First Modification

The block configuration is merely one example and the block configuration to which the present invention can be applied is not limited to the block configuration. For example, the server device 2 may execute the processing of the autonomous driving determination unit 17 described in the embodiment as a substitute for the driving assistance device 1.

In this case, the server device 2 receives the present position information, the autonomous driving capability information Ic and the vehicle identification information Id from the driving assistance device 1 of a traveling vehicle to thereby recognize the road section and the lane corresponding to the position indicated by the received present position information. Then, by referring to the autonomous driving regulatory information Ir of the distribution map DB 21 corresponding to the recognized road section and the recognized lane, the server device 2 determines the feasible automation level Lv with which the vehicle equipped with the driving assistance device 1 is compatible. The server device 2 sends the information on the feasible automation level Lv to the driving assistance device 1. In this case, on the basis of the information sent from the server device 2, the autonomous driving control unit 18 of the driving assistance device 1 recognizes the feasible automation level Lv and performs autonomous driving.

Second Modification

The autonomous driving regulatory information Ir may be information for regulating autonomous driving per driving function (referred to as "autonomous driving function Fc") to be automated. In this case, for example, automation levels Lv are defined with respect to each autonomous driving function Fc and the autonomous driving determination unit 17 determines the feasible automation level Lv with respect to each autonomous driving function Fc. It is noted that examples of the autonomous driving function Fc include a LKA (Lane Keeping Assist) function, a self-steering function and an automatic speed adjustment function.

Figure 8A:
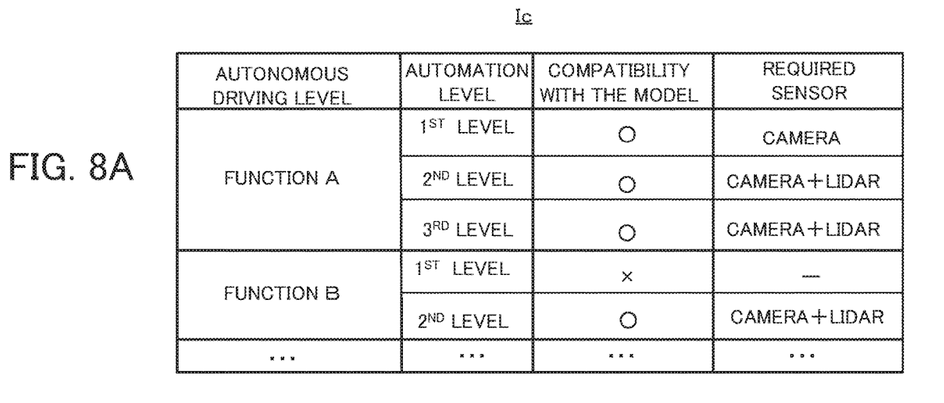
FIGS. 8A and 8B indicate the data structure of autonomous driving capability information and autonomous driving regulatory information according to a modification.

FIG. 8A illustrates an example of the data structure of the autonomous driving capability information Ic according to the modification. In the example illustrated in FIG. 8A, there exists a function A and a function B as the autonomous driving function Fc, wherein the function A has three automation levels Lv and the function B has two automation levels Lv. The autonomous driving capability information Ic in FIG. 8A indicates that the vehicle of the driving assistance device 1 corresponds to the first to the third levels of the function A and the second level of the function B and that it does not corresponds to the first level of the function B.

Figure 8B:
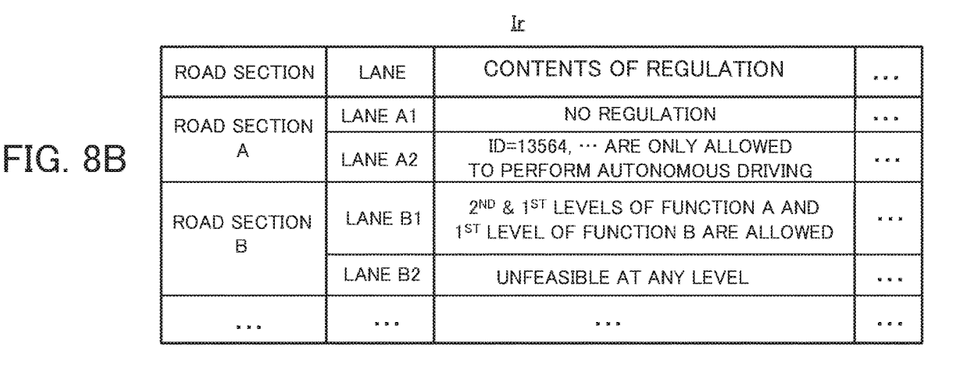

FIG. 8B illustrates an example of the data structure of the autonomous driving regulatory information Ir according to the modification. According to FIG. 8B, regarding the lane B1 of the road section B, the autonomous driving regulatory information Ir restricts the feasibility with respect to each autonomous driving function Fc and its feasible automation level Lv. Concretely, it indicates that the function A at a level equal to or under second level and the function B at the first level can be performed on the lane B1 of the road section B. In this case, on the basis of the autonomous driving capability information Ic illustrated in FIG. 8A, regarding the lane B1 of the road section B, the autonomous driving determination unit 17 determines that the function B at the first level cannot be performed and that the function A at the first and the second levels can be performed. As described above, the autonomous driving regulatory information Ir includes information for restricting the feasible autonomous driving function Fc and its automation level Lv.

Thus, in the present modification, the server device 2 stores the distribution map DB 21 including the autonomous driving regulatory information Ir as illustrated in FIG. 8B and sends the map data D1 extracted from the distribution map DB 21 to the driving assistance device 1 to thereby let the driving assistance device 1 store the partial map DB 10 including the autonomous driving regulatory information Ir. Thereby, in such a case that the automation levels Lv are defined with respect to each autonomous driving function Fc, the driving assistance device 1 can suitably determine the feasible automation level Lv with respect to each autonomous driving function Fc by referring to the autonomous driving capability information Ic and the autonomous driving regulatory information Ir to perform the autonomous driving.

In the present modification, at the time of displaying the level indication lines Ln on the map as illustrated in FIG. 6, the display control unit 19 of the driving assistance device 1 may display the level indication lines Ln in such a state that a feasible set of the autonomous driving function Fc and the automation level Lv can be identified per road. In this case, for example, while displaying the level indication lines Ln with respect to each feasible autonomous driving function Fc, the display control unit 19 changes the display mode (e.g., line type and/or line width) of the level indication lines Ln with respect to each feasible autonomous driving function Fc depending on its feasible automation level Lv.

It is noted that, instead of the example in FIG. 8, any automation level Lv may not be provided to each autonomous driving function Fc. In this case, information on the feasibility with respect to each autonomous driving function Fc is registered in the item "CONTENTS OF REGULATION" of the autonomous driving regulatory information Ir, and information on the compatibility of the vehicle with respect to each autonomous driving function Fc is registered in the autonomous driving capability information Ic.

Third Modification

The driving assistance device 1 may acquire and store the autonomous driving regulatory information Ir apart from the partial map DB 10. In this case, for example, the driving assistance device 1 may preliminarily store the autonomous driving regulatory information Ir corresponding to all road sections or may acquire the autonomous driving regulatory information Ir from the server device 2 at a timing other than a timing of acquiring the map data D1 from the server device 2.

Fourth Modification

The driving assistance device 1 may receive all data of the distribution map DB 21 from the server device 2 and store it instead of receiving the map data D1 which is a part of the distribution map DB 21. In this case, the driving assistance device 1 preliminarily stores the distribution map DB 21 generated at a predetermined time and receives data necessary to update the distribution map DB 21 from the server device 2. In this case, at predetermined time intervals, the driving assistance device 1 sends an inquiry of the necessity of updating the stored map data to the server device 2, and downloads data for updating the distribution map DB 21 from the server device 2 if necessary.

Fifth Modification

The autonomous driving system may include, in addition to the driving assistance device 1 and the server device 2, a distribution server which mediates the data communication of the map data D1 between the driving assistance device 1 and the server device 2. In this case, the distribution server receives a request signal of the map data D1 from the driving assistance device 1 and acquires the map data D1 based on the request signal from the server device 2. Then, the distribution server sends the map data D1 acquired from the server device 2 to the driving assistance device 1 which requests the map data D1.

Sixth Modification

In the above-mentioned embodiment, as indicated in FIG. 5, the contents of the regulations of autonomous driving are registered_per_lane. Instead, as the autonomous driving regulatory information Ir, the contents of the regulations of the autonomous driving may be registered per road section.

Seventh Modification

In the above-mentioned embodiment, as indicated in FIG. 5, the contents of the regulations of autonomous driving are registered per lane. Instead, as the autonomous driving regulatory information Ir, the contents of the regulations of autonomous driving may be registered with respect to each predetermined area. In this case, the common registered restriction of autonomous driving is applied to any road sections and any lanes in the same area. According to such a configuration, it becomes unnecessary to determine the autonomous driving level per road or per lane and it is possible to reduce the burden of the arithmetic processing. For example, each predetermined area described above is determined according to each administrative district and the contents (e.g., autonomous driving level) of regulations of autonomous driving with respect to each area divided per administrative district.

Eighth Modification

The contents of the regulations of autonomous driving may be registered per POI or per feature as the autonomous driving regulatory information Ir included in the partial map DB 10 and the distribution map DB 21. In this case, each POI and feature may be displayed in association with the corresponding regulatory information on autonomous driving.

Figure 9:
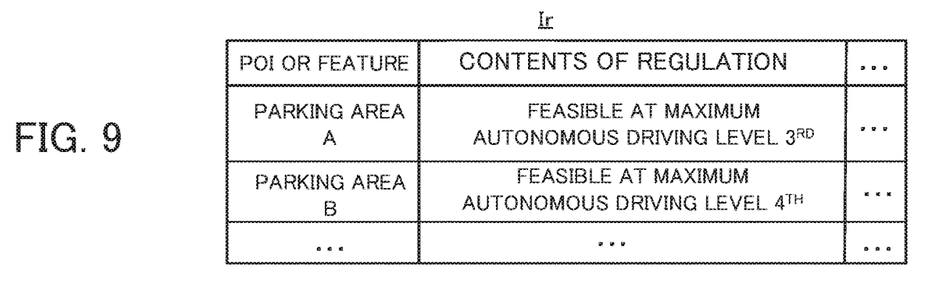
FIG. 9 indicates the data structure of a part of autonomous driving regulatory information according to a modification.
Figure 10:
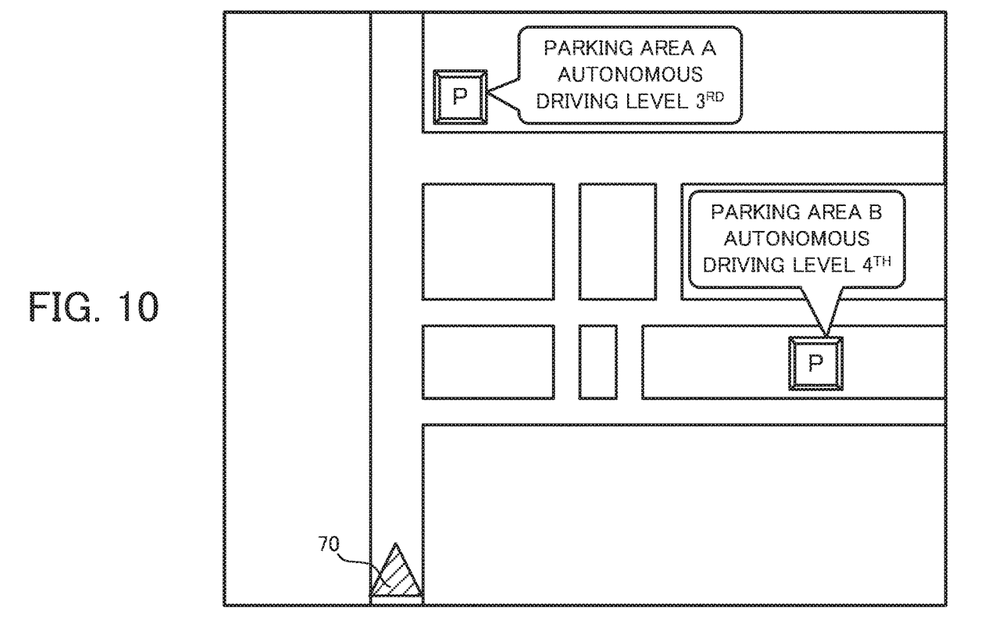
FIG. 10 illustrates a display example based on the autonomous driving regulatory information illustrated in FIG. 9.

FIG. 9 illustrates an example of the data structure of a part of the autonomous driving regulatory information Ir according to the present modification. FIG. 10 illustrates a display example indicating contents of regulations of autonomous driving with respect to the parking areas A and B according to the autonomous driving regulatory information Ir in FIG.

9. On the autonomous driving regulatory information Ir illustrated in FIG. 9, the contents of the regulation are registered with respect to each parking area that is one example of a POI. In the display example illustrated in FIG. 10, the display control unit 19 displays the parking areas A and B registered on the autonomous driving regulatory information Ir in FIG. 9 in association with the corresponding regulatory information on the autonomous driving.

In a parking area, it is possible to automatically drive the vehicle to park after the entrance to the parking area. It is assumed that the feasible autonomous driving level could be different depending on the size of the parking area and other environment. Thus, for example, in such a case that the parking space is relatively large and/or that there is an object (e.g., what can be detected by sensor such as a compartment line and a pole) in or around the parking space to be used at the time of precisely estimating the present position of the vehicle, the autonomous driving level is determined to be high. In contrast, in such a case that the parking space is relatively small and/or that there is not any object in or around the parking space to be used at the time of precisely estimating the present position of the vehicle, the autonomous driving level is determined to be low.

Instead of the display example illustrated in FIG. 10, the driving assistance device 1 may display POIs and/or features registered on the autonomous driving regulatory information Ir in different colors (i.e., by color coding per feasible autonomous driving level) depending on the corresponding regulatory information on the autonomous driving.

BRIEF DESCRIPTION OF REFERENCE NUMBERS

1 Driving assistance device
2 Server device
9 Network
11 Communication unit
12 Storage unit
13 Sensor unit
14 Input unit
15 Control unit
16 Output unit

The invention claimed is:

1. A driving assistance device for an autonomous vehicle, comprising:
an electronic memory;
one or more electronic sensors;
an electronic display output unit configured to display maps; and
an electronic processor configured to:
retrieve, from the one or more electronic sensors, electronic information indicating a current position of the vehicle;
acquire, from an external electronic device in electronic communication with the electronic processor, map information and autonomous driving regulatory information for one or more predetermined sections of a geographical area correspondent to the retrieved current position of the vehicle,
the acquired autonomous driving regulatory information indicating an automation level for at least one autonomous driving function that the autonomous vehicle is capable of performing during autonomous driving,
the automation level being selected from any one of a level corresponding to a prohibition of the vehicle from performing the at least one autonomous driving function and plural levels respectively corresponding to degrees of abilities by which the vehicle is permitted to perform the at least one autonomous driving function, and
the at least one autonomous driving function being selected from any of lane keeping assist, self-steering, and automatic speed adjustment;
display, on the electronic display output unit, and based on the acquired autonomous driving regulatory information and the map information, a graphic representation of a map of the geographical area together with, at a location of each one of the one or more predetermined sections of the geographical area represented on the map, a representation of the automation level for the at least one driving function for the respective one of the one or more predetermined sections on the map; and
control an autonomous driving unit of the vehicle so as to change a mode of operation of the autonomous driving unit based on the acquired autonomous driving regulatory information.

2. The driving assistance device according to claim 1, wherein the autonomous driving regulatory information is information indicating the automation level at which autonomous vehicles can perform each function of the autonomous driving.

3. A control method executed by an electronic device equipped with an electronic memory, one or more electronic sensors, an electronic display output unit, and an electronic processor in communication with the electronic sensors and the electronic display output unit, the control method comprising:
the electronic processor retrieving, from the electronic sensors, electronic information indicating a current position of the vehicle;
the electronic processor acquiring, from an external device in communication with the electronic processor, map information and autonomous driving regulatory information for one or more predetermined sections of a geographical area correspondent to the acquired current position of the vehicle,
the acquired autonomous driving regulatory information indicating an automation level for at least one autonomous driving function that the autonomous vehicle is capable of performing during autonomous driving,
the automation level being selected from any one of a level corresponding to a prohibition of the vehicle from performing the at least one autonomous driving function and plural levels respectively corresponding to degrees of abilities by which the vehicle is permitted to perform the at least one autonomous driving function,
the at least one autonomous driving function being selected from any of lane keeping assist, self-steering, and automatic speed adjustment;
the electronic processor outputting to the electronic display output unit, based on the acquired autonomous driving regulatory information and the map information, data for generating a graphic representation of a map of the geographical area, and data of the automation level for the at least one driving function for each one of the one or more predetermined sections of the geographical area represented on the map;
the electronic display output unit displaying, at a location of each one of the one or more predetermined sections of the geographical area represented on the map, a representation of the automation level for the at least one driving function for the respective one of the one or more predetermined sections on the map; and the electronic processor controlling an autonomous driving unit of the vehicle data to change a mode of operation of the autonomous driving unit based on the acquired autonomous driving regulatory information.

4. A non-transitory computer readable medium including instructions executable by an electronic computer of a driving assistance output device for an autonomous vehicle that, when executed by the electronic computer of the output device, cause the output device to:

retrieve, from one or more electronic sensors in communication with the output device, electronic information indicating a current position of the vehicle;

acquire, from an external electronic device in communication with the output device, map information and autonomous driving regulatory information for one or more predetermined sections of a geographical area correspondent to the retrieved current position of the vehicle, the acquired autonomous driving regulatory information indicating an automation level for at least one autonomous driving function that the autonomous vehicle is capable of performing during autonomous driving, the automation level being selected from any one of a level corresponding to a prohibition of the vehicle from performing the at least one autonomous driving function and plural levels respectively corresponding to degrees of abilities by which the vehicle is permitted to perform the at least one autonomous driving function, and the at least one autonomous driving function being selected from any of lane keeping assist, self-steering, and automatic speed adjustment;

display, on an electronic display output unit in communication with the output device, and based on the acquired autonomous driving regulatory information and the map information, a graphic representation of a map of the geographical area together with, at a location of each one of the one or more predetermined sections of the geographical area represented on the map, a representation of the automation level for the at least one driving function for the respective one of the one or more predetermined sections on the map; and control an autonomous driving unit of the vehicle so as to change a mode of operation of the autonomous driving unit based on the acquired autonomous driving regulatory information.

* * * * *